(12) United States Patent
Yoon et al.

(10) Patent No.: US 9,704,271 B2
(45) Date of Patent: Jul. 11, 2017

(54) METHOD AND APPARATUS FOR IMAGE BLURRING

(71) Applicant: Samsung Electronics Co., Ltd., Gyeonggi-do (KR)

(72) Inventors: Uison Yoon, Gyeonggi-do (KR); Jisoo Yeh, Gyeonggi-do (KR); Seokyoung Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/957,153

(22) Filed: Dec. 2, 2015

(65) Prior Publication Data

US 2016/0155216 A1 Jun. 2, 2016

(30) Foreign Application Priority Data

Dec. 2, 2014 (KR) .................. 10-2014-0170788

(51) Int. Cl.
| | | |
|---|---|---|
| *G06K 9/40* | (2006.01) | |
| *G06T 11/00* | (2006.01) | |
| *G06T 5/00* | (2006.01) | |
| *G06T 5/20* | (2006.01) | |
| *G06T 5/50* | (2006.01) | |

(52) U.S. Cl.
CPC ............. *G06T 11/00* (2013.01); *G06T 5/002* (2013.01); *G06T 5/20* (2013.01); *G06T 5/50* (2013.01); *G06T 2207/20221* (2013.01)

(58) Field of Classification Search
CPC .. G06T 5/002; G06T 5/20; G06T 5/50; G06T 2207/20024; G06T 2207/20216; G06T 2207/20182; G06T 2207/20092; G06T 2207/20221

USPC .......................................... 382/264
See application file for complete search history.

(56) References Cited

U.S. PATENT DOCUMENTS

| | | | |
|---|---|---|---|
| 2009/0110285 A1 | 4/2009 | Elad et al. | |
| 2010/0272356 A1* | 10/2010 | Hong .................... | G06T 7/0002 382/170 |
| 2012/0082376 A1 | 4/2012 | Hunt | |
| 2012/0307009 A1* | 12/2012 | Li ....................... | H04N 5/23229 348/46 |
| 2013/0132044 A1* | 5/2013 | Paris ..................... | G02C 7/028 703/2 |
| 2013/0236117 A1 | 9/2013 | Lee et al. | |
| 2013/0272612 A1 | 10/2013 | Sim et al. | |
| 2014/0314333 A1* | 10/2014 | Takahashi ............ | A61B 6/5258 382/264 |

FOREIGN PATENT DOCUMENTS

| | | |
|---|---|---|
| KR | 1020130117378 | 10/2013 |
| KR | 1020140082384 | 7/2014 |

OTHER PUBLICATIONS

International Search Report dated Mar. 9, 2016 issued in counterpart application No. PCT/KR2015/013068, 3 pages.

* cited by examiner

*Primary Examiner* — Kanjibhai Patel
(74) *Attorney, Agent, or Firm* — The Farrell Law Firm, P.C.

(57) ABSTRACT

Provided are a method and apparatus for giving a blurring effect of various levels to a given image. In the blur image processing method, the apparatus obtains an original image and blur-related information for generating a blur image. The apparatus generates a diagonal image with regard to each pixel, based on the original image, and generates the blur image from the diagonal image by using the blur-related information.

22 Claims, 18 Drawing Sheets

FIG. 1A

1. Generation of sum image

| 5 | 2 | 1 | 2 | 1 |
|---|---|---|---|---|
| 3 | 1 | 1 | 1 | 1 |
| 3 | 1 | 2 | 1 | 1 |
| 1 | 3 | 1 | 1 | 5 |
| 3 | 1 | 1 | 2 | 1 |

Numerical values of generated sum image →

| 5 | 7 | 8 | 10 | 11 |
|---|---|---|----|----|
| 8 | 11 | 13 | 16 | 18 |
| 11 | 15 | 19 | 23 | 26 |
| 12 | 19 | 24 | 29 | 37 |
| 15 | 23 | 29 | 36 | 45 |

Original image

Blur image using sum image

Enlarged image of blur image

Neighboring pixel weighting model using sum image

Neighboring pixel weighting model of this invention

Blur image using sum image

Blur image using diagonal image

METHOD AND APPARATUS FOR IMAGE BLURRING

PRIORITY

This application claims priority under 35 U.S.C. §119(a) to a Korean Patent Application filed on Dec. 2, 2014 in the Korean Intellectual Property Office and assigned Serial No. 10-2014-0170788, the entire disclosure of which is incorporated herein by reference.

BACKGROUND

1. Field of the Invention

The present invention generally relates to an image blurring technique for rendering an image indistinct, and more particularly, to a method and apparatus for giving a blurring effect of various levels to a given image.

2. Description of the Related Art

With the growth of technology, a variety of electronic devices, such as a smart phone or a tablet PC, having a camera module have become increasingly popular. Also, an edit application or program for giving various graphical effects to an image captured by a camera module has become widely used.

One of such graphical effects is blurring which intentionally degrades the quality (or definition) of a given image so that a user may accept the image as indistinct. Typically, blurring is processed by applying a mean filter or a Gaussian filter to an image. In this case, the filter is applied to a lot of pixels contained in a single image. Therefore, as the number of pixels contained in the image increases, a computation complexity for blurring is also increased.

Typical blurring determines the value of an image pixel as the average of neighboring N-by-N pixel data with the same weighted values applied. Specifically, for quick blurring, a sum image is generated first and then blurring is computed using the generated sum image. Since the same weighted values are applied to neighboring N-by-N pixel data, box-shaped boundaries may often appear in a blur image. This undesirable phenomenon may be more serious when the value of N is higher. In addition, a processed image may appear as an overlap of an original image rather than a blur image.

SUMMARY

Accordingly, an aspect of the present invention provides a method and apparatus for image blurring.

According to an aspect of the present invention, a blur image processing method of an electronic device includes obtaining an original image and blur-related information for generating a blur image; generating a diagonal image with regard to each pixel, based on the original image; and generating the blur image from the diagonal image by using the blur-related information.

According to an aspect of the present invention, a blur image processing apparatus includes an input unit configured to obtain an original image and a blur-related information for generating a blur image; a control unit configured to generate a diagonal image with regard to each pixel, based on the original image, and to generate the blur image from the diagonal image by using the blur-related information; and an output unit configured to display the blur image.

BRIEF DESCRIPTION OF THE DRAWINGS

The above and other aspects, features, and advantages of certain embodiments of the present invention will be more apparent from the following description, taken in conjunction with the accompanying drawings, in which:

FIGS. 1A and 1B are diagrams illustrating an image blurring process using a sum image;

DETAILED DESCRIPTION

Figure 1B:
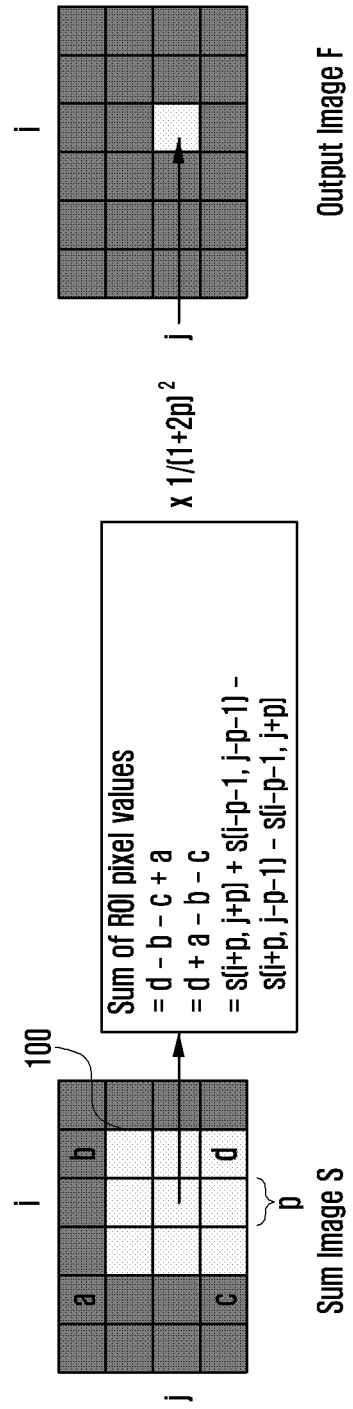

Hereinafter, various embodiments of the present invention will be described with reference to the accompanying drawings.

This disclosure may be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of the present invention may be employed in varied and numerous embodiments without departing from the scope of the invention.

Furthermore, well known or widely used techniques, elements, structures, and processes may not be described or illustrated in detail to avoid obscuring the essence of the present disclosure. Although the drawings represent certain embodiments, the drawings are not necessarily to scale and certain features may be exaggerated or omitted in order to better illustrate and explain the present disclosure. Through the drawings, the same or similar reference numerals denote corresponding features consistently.

Unless defined differently, all terms used herein, which include technical terminologies or scientific terminologies, have the same meaning as that understood by a person skilled in the art to which the present invention belongs. Singular forms are intended to include plural forms unless the context clearly indicates otherwise.

Terms such as "comprise", "include", and/or "have" may be construed to denote a certain characteristic, number, step, operation, constituent element, component or a combination thereof, but are not to be construed to exclude the existence of or a possibility of the addition of one or more other characteristics, numbers, steps, operations, constituent elements, components or combinations thereof. The expression "or" includes any and all combinations of the associated listed words. For example, the expression "A or B" may include A, may include B, or may include both A and B.

As used herein, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them the first user device and the second user device are user devices. For example, a first element could be referred to as a second element, and similarly, a second element could be also be referred to as a first element without departing from the scope of the present disclosure.

It will be understood that each block of flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the illustrated order. For example, two blocks shown in succession may in fact be executed substantially concurrently or the blocks may sometimes be executed in the reverse order, depending upon the functionality involved.

The terms "unit" or "module", as used herein, may refer to a software or hardware component or device, such as a Field Programmable Gate Array (FPGA) or Application Specific Integrated Circuit (ASIC), which perform certain tasks. A unit or module may be configured to reside on an addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

In this disclosure, an image to which a blurring effect will be applied will be referred to as an original image, an input image, or a target image.

Additionally, in this disclosure, an image to which a blurring effect is applied will be referred to as an output image, a blur image, or a blurred image.

Also, in this disclosure, a certain image may be considered as a set of pixel values which constitute the image.

In this disclosure, an electronic device, also referred to as a terminal, refers to all kinds of devices having an operating unit such as a central processing unit (CPU). For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch). Additionally, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame. Also, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, an industrial or home robot, an ATM (Automatic Teller Machine), or a POS (Point of Sales) device.

Now, an embodiment of the present invention will be described in detail with reference to the drawings.

FIGS. 1A and 1B show diagrams illustrating an image blurring process using a sum image.

Referring to FIG. 1A, a sum image is generated from an original image through accumulative summation, and then a blur image is generated by applying a mean filter to the generated sum image. Specifically, the sum image is formed of pixel values, each of which is obtained as a result of accumulatively adding a numerical value (hereinafter, a pixel value) indicating the color of each pixel contained in the original image (i.e., a target image). For example, in case of an original image having an m×n size, the pixel value of (i, j) pixel is determined as the sum of the pixel value of (1, 1) pixel, the pixel value of (1, 2) pixel, the pixel value of (1, 3) pixel, . . . , the pixel value of (1, j) pixel, the pixel value of (2, 1) pixel, the pixel value of (2, 2) pixel, the pixel value of (2, 3) pixel, . . . , the pixel value of (2, j) pixel, . . . , the pixel value of (i, 1) pixel, the pixel value of (i, 2)

pixel, . . . , the pixel value of (i, j−1) pixel, and the pixel value of (i, j) pixel. This is expressed as Equation (1).

$$S(i, j) = \sum_{b=1}^{j} \sum_{a=1}^{i} I(i, j) \quad (1)$$

After generating the sum image according to Equation (1), the blurring process applies a mean filter to a region of interest (ROI). Specifically, in FIG. 1B, blurring for the ROI 100 may be obtained dividing the sum of pixel values in the ROI 100 by a variable associated with a weighted value of the ROI 100. The sum of pixel values of the ROI 100 may be obtained as "d−b−c+a". The variable associated with a weighted value of the ROI 100 may be expressed as "(1+2p)$^2$". The blurring output is expressed as Equation (2).

$$f(i, j) = \frac{s(i+p, j+p) + s(i-p-1, j-p-1) - s(i+p, j-p-1) - s(i-p-1, j+p)}{(1+2p)^2}, \quad (2)$$

$$p = \frac{\text{filter size} - 1}{2} \text{ and } p = \text{odd number}$$

Figure 2A:
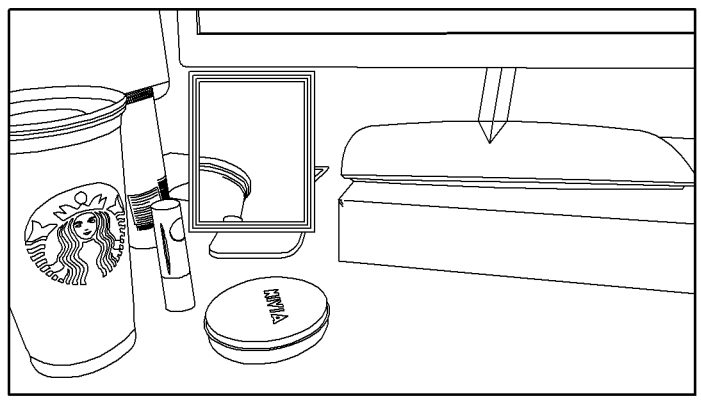
FIGS. 2A, 2B and 2C show an original image and a blur image obtained by an image blurring process using a sum image.
Figure 2B:
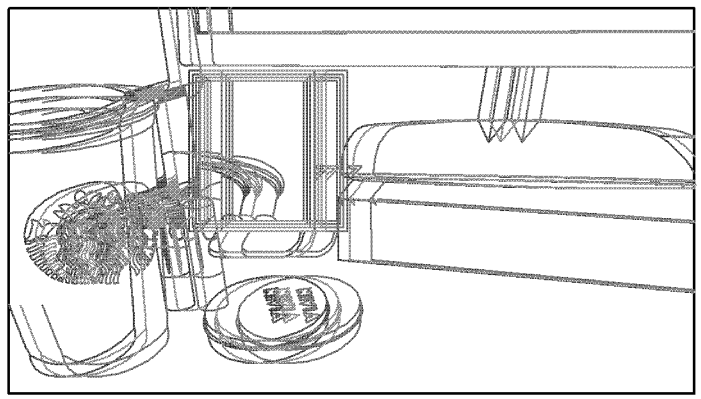
Figure 2C:
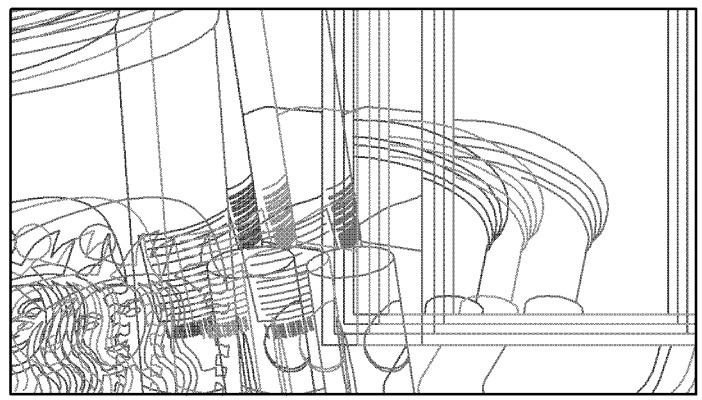

FIGS. 2A-2C show an original image, a blur image, and an enlarged blur image obtained by an image blurring process using a sum image.

Referring to FIG. 2A, an original image is shown. In FIG. 2B, a blur image obtained using Equations (1) and (2) may have some artifacts which occur as a box-like shape. This phenomenon is caused by the same weighted values applied to pixel values contained in the ROI. Therefore, depending on filter sizes, box-shaped boundaries may appear. Furthermore, in an enlarged view of FIG. 2C, some overlaps of an original image rather than a blur image may be seen.

Figure 3A:
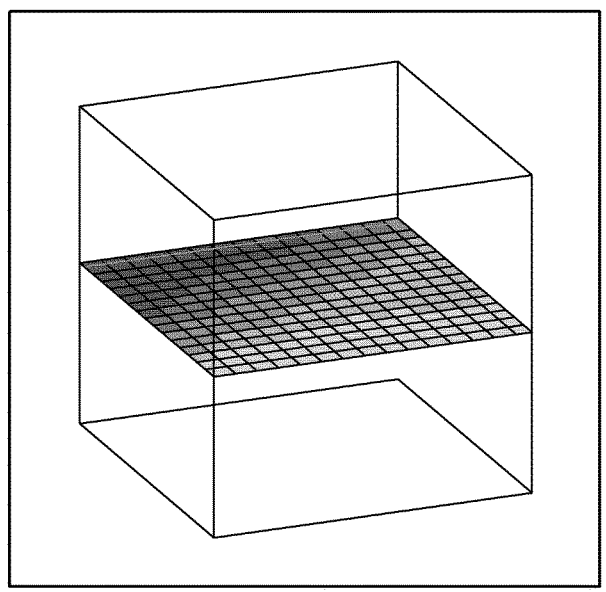
FIGS. 3A and 3B show neighboring pixel weighting models used for an image blurring method according to the present invention.
Figure 3B:
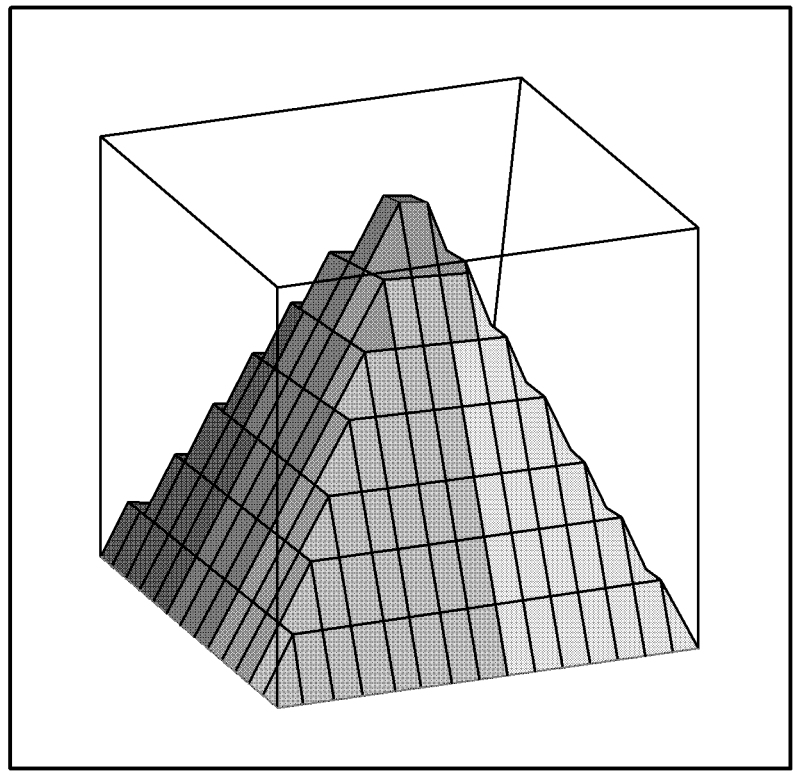

FIGS. 3A and 3B show neighboring pixel weighting models used for an image blurring method according to the present invention.

Referring to FIG. 3A, the above-discussed blurring process is based on a typical weighting model which applies the same weighted values to neighboring pixels. However, in FIG. 3B, a blurring process according to the present invention uses another weighting model in which higher weighted values are applied to central pixels and lower weighted values are applied to neighboring pixels. This avoids the occurrence of artifacts and the deterioration of a blurring quality which may be caused in case of a larger ROI.

Figure 4:
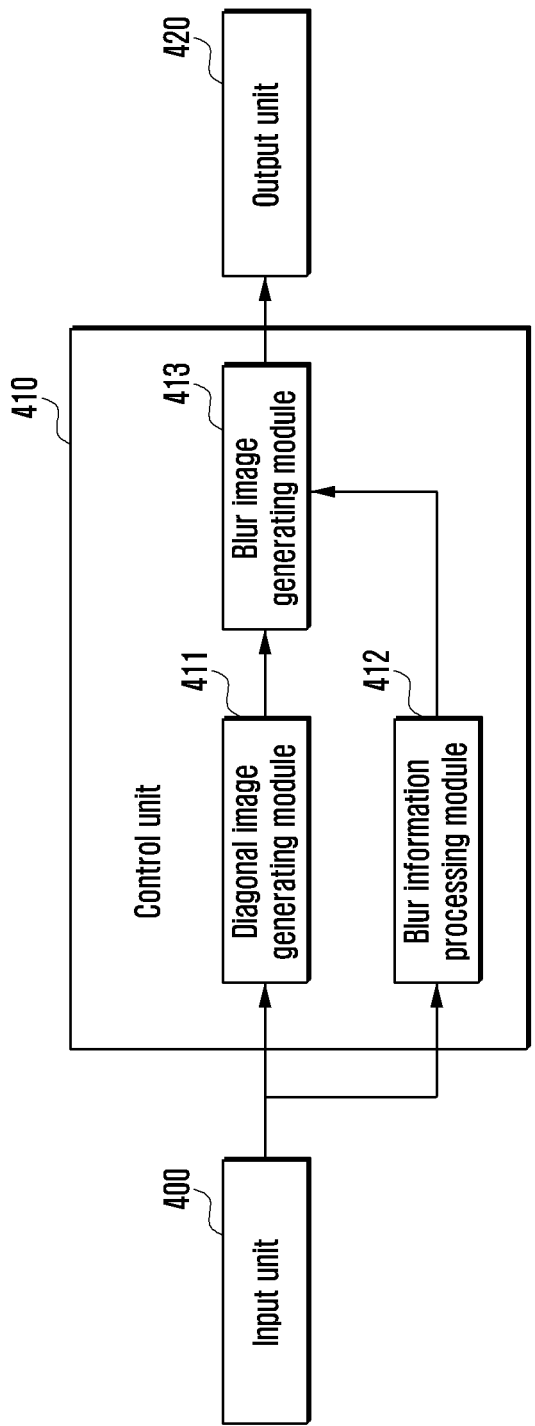
FIG. 4 is a block diagram illustrating an electronic device for performing an image blurring method according to an embodiment of the present invention.

FIG. 4 is a block diagram illustrating an electronic device for performing an image blurring method according to an embodiment of the present invention.

Referring to FIG. 4, the electronic device performs an image blurring method according to the present invention, and hence may be referred to as a blur image processing apparatus. This apparatus may include, but is not limited to, an input unit 400, a control unit 410, and an output unit 420. Although not shown in FIG. 4, the blur image processing apparatus may further include a memory unit, and the like. The apparatus may be implemented as a smart phone, a tablet PC, or any other electronic device. Additionally, the control unit 410 includes a diagonal image generating module 411, a blur information processing module 412, and a blur image generating module 413. While FIG. 4 shows three modules 411, 412 and 413 of the control unit 410, such modules are divided for the convenience of illustration and may be integrated or divided differently.

A user, using the input unit 400, may enter an image for blurring according to the present invention. In various embodiments, the input unit 400 may be a camera module of a smart phone or tablet PC, or an entered image file itself. Also, the input unit 400 may be a touch panel or may be implemented in the form of touch screen together with the output unit 420. In this case, the touch panel detects a user's touch input, generates a corresponding touch signal, and delivers the touch signal to the control unit 410. According to the present invention, the touch signal may contain location information (X-axis, Y-axis) and pressure information (Z-axis). Therefore, when any touch input occurs, the control unit 410 may obtain information about a touch pressure as well as a touch location.

The input unit 400 may receive a target image and deliver the received target image to the control unit 410, in particular, to the diagonal image generating module 411. Also, the input unit 400 may receive blur-related information to be used for generation of a blur image.

The blur-related information may be a blur level, i.e., a degree of blurring processing in response to a user input, a size and/or type of a blur filter, and/or information about a blurring target region. In an embodiment of the present invention, the blur level may be set in advance, depending on the performance of the blur image processing apparatus, or selected by a user. Additionally, blurring may be performed for only a part of a target image, and the blur level may be set or selected differently according to respective pixels.

The blur image processing apparatus may receive the blur-related information through the touch screen. This technique using the touch screen will be described later with reference to FIG. 9.

The diagonal image generating module 411 generates a sum image based on respective pixel values of a target image entered from the input unit 400, and then generates a diagonal image by using the generated sum image. The sum image and the diagonal image may be generated and stored in individual steps, or the diagonal image may be computed in a single step.

The sum image may be formed using the sum of pixel values obtained as a result of accumulatively adding respective pixel values contained in a target image. In the present invention, when pixel values of a blur image are computed from the diagonal image generated using the sum image, a weighted value of a central region may be higher than that of a neighboring region. A method for generating the diagonal image by the diagonal image generating module 411 will be described in detail with reference to FIGS. 5, 6, and 8.

The blur information processing module 412 selects the blur level, namely the size of a blur filter, depending on information entered at the input unit 400. A higher blur level gives a more indistinct effect, and a lower blur level results in an image much closer to an original image. According to the present invention, the same blur level may be applied to the entire target image or to each region thereof, and a certain image having different blur levels for respective pixels may be generated. In addition, the blur information processing module 412 may store a blur level map, predefined or varied according to user input, and instruct the blur image generating module 413 to generate a blur image based on the stored blur level map.

The blur image generating module 413 generates the blur image from the diagonal image generated by the diagonal image generating module 411 and the blur level selected by the blur information processing module 412. The blur image may be generated with the same blur level applied to a target image or region or with different blur levels applied to respective pixels. This method for generating the blur image by the blur image generating module 413 by using the diagonal image generated by the diagonal image generating module 411 will be described later with reference to FIG. 7.

The output unit 420 displays the blur image, or outputs the blur image to any other device. In an embodiment of the present invention, the output unit 420 may be implemented as a display unit. Also, the output unit 420 may be combined with the above-discussed input unit 400 to form the touch screen.

Figure 5:
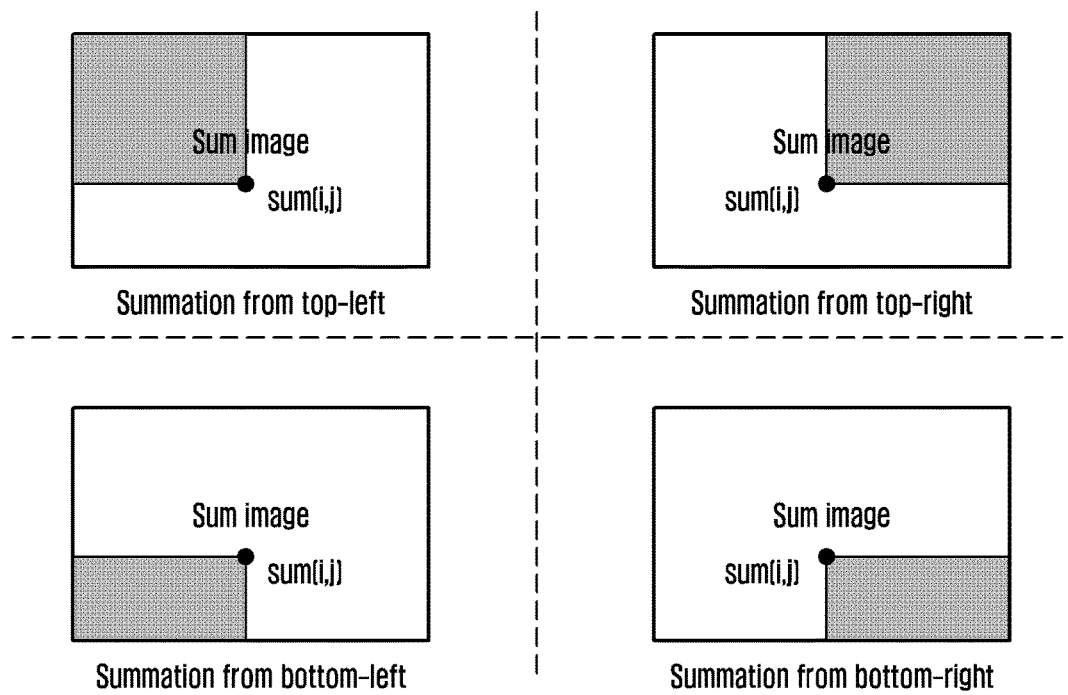
FIG. 5 is a diagram illustrating an operation of generating a sum image according to an embodiment of the present invention.
Figure 6:
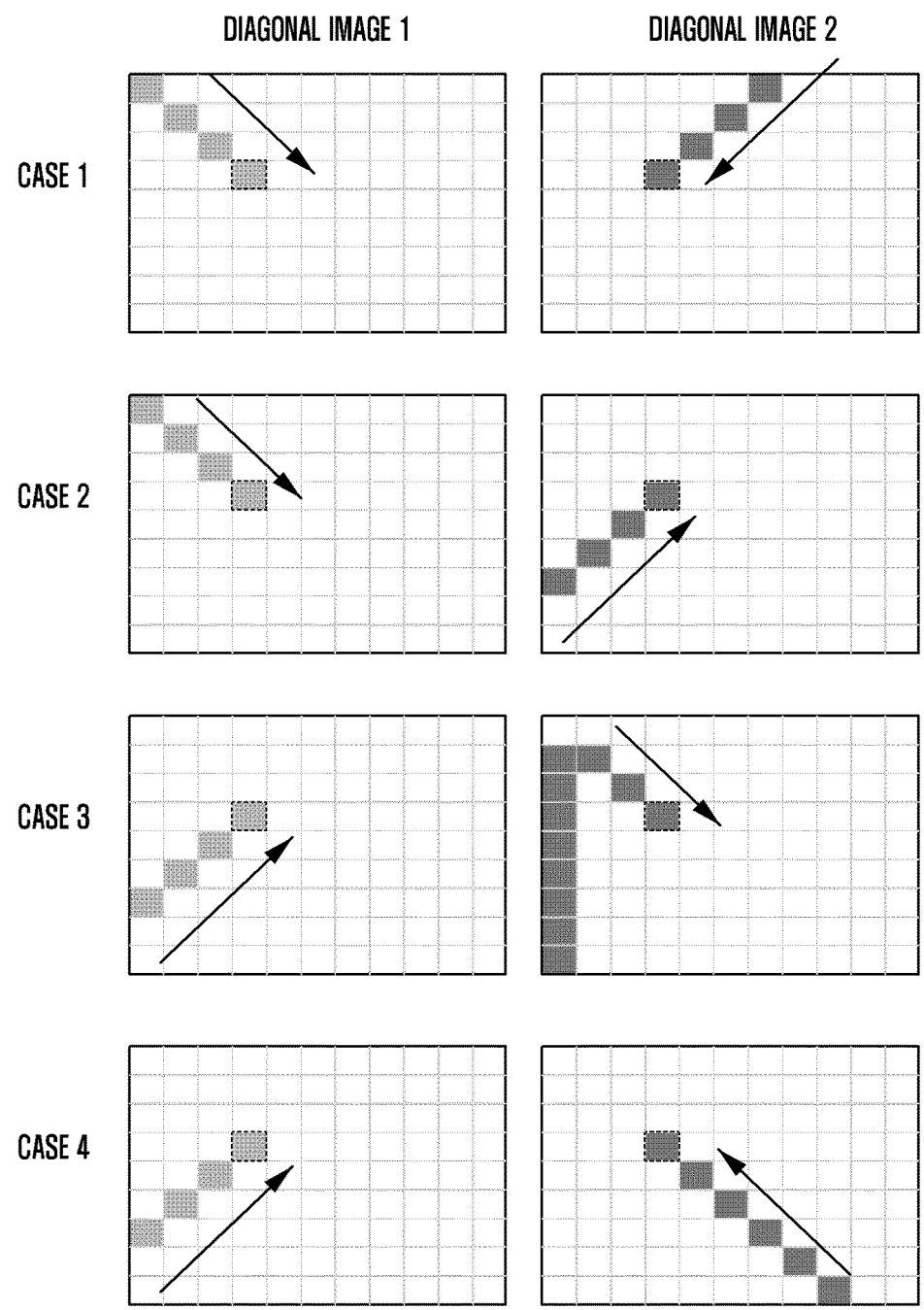
FIG. 6 is a diagram illustrating an operation of generating a diagonal image according to an embodiment of the present invention.

FIGS. 5 and 6 show a process of generating a diagonal image by the diagonal image generating module 411.

Specifically, the diagonal image generating module 411 may generate a sum image from a target image as shown in FIG. 5 and then generate a diagonal image from the generated sum image as shown in FIG. 6. Although the diagonal image is generated through the sum image generated from the target image in this embodiment, this is merely an example, and is not intended to limit the invention. Alternatively, the diagonal image may be directly generated from the target image through a single step. This case will be described later with reference to FIG. 8.

FIG. 5 is a diagram illustrating an operation of generating a sum image by the diagonal image generating module 411 according to an embodiment of the present invention.

The diagonal image generating module 411 generates the sum image through Equation (1) discussed above. Specifically, the sum image may be a set of pixel values accumulatively added from a certain starting pixel. Namely, as shown in FIG. 5, the pixel value (hereinafter, a summed pixel value) of a particular point (i, j) in the sum image may be the sum of pixel values contained in a region which starts from the starting pixel and ends at the particular point in the target image. The starting pixel is not limited to a specific point. The starting pixel may be one of four corners of the target image as shown. Meanwhile, the sum image generated by the diagonal image generating module 411 may be used per se for blurring as shown in FIG. 1 or used for the generation of the diagonal image.

FIG. 6 is a diagram illustrating an operation of generating a diagonal image at the diagonal image generating module 411 according to an embodiment of the present invention.

Referring to FIG. 6, the diagonal image generating module 411 generates the diagonal image by using the generated sum image. Specifically, the diagonal image may be a set of the summed pixel values disposed on a diagonal path from the starting pixel to the particular point. Namely, the pixel value (hereinafter, a diagonally summed pixel value) of the particular point in the diagonal image may be the sum of summed pixel values arranged along one of four diagonal paths of the particular point in the sum image. Alternatively, the diagonal image may be formed as a set of two diagonal images generated by accumulatively adding the summed pixel values along different diagonal paths.

FIG. 6 shows four cases of generating a set of two diagonal images. This is, however, for illustrative purposes only and not to be considered as a limitation.

Meanwhile, the blur image processing apparatus of the present invention may generate the diagonal image directly from the target image, based on blur-related information, without generating the sum image discussed in FIG. 5. Namely, the generation of the diagonal image does not always require the two steps discussed above. Specifically, diagonally summed pixel values in the diagonal image may be generated directly from pixel values in the target image, as shown in Equation (3).

$$D_1(i, j) = \begin{cases} \sum_{n=1}^{j} \left\{ \sum_{b=1}^{n} \sum_{a=1}^{i-j+n} I(a, b) \right\} (i \geq j) \\ \sum_{n=1}^{i} \left\{ \sum_{b=1}^{j-i+n} \sum_{a=1}^{n} I(a, b) \right\} (i < j) \end{cases} \quad (3)$$

$$D_2(i, j) = \begin{cases} \sum_{n=1}^{j} \left\{ \sum_{b=1}^{n} \sum_{a=1}^{i+j-n} I(a, b) \right\} (i + j \leq W) \\ \sum_{n=1}^{W} \left\{ \sum_{b=1}^{i+j-n} \sum_{a=1}^{n} I(a, b) \right\} (i + j > W) \end{cases}$$

According to Equation (3), a diagonally summed pixel value may be computed directly from pixel values of the target image. As a result of computation, two kinds of diagonal images $D_1$ and $D_2$ may be generated. The diagonal images generated according to Equation (3) may be one of the four cases shown in FIG. 6. In the case of generating the diagonal image based on Equation (3), the step of generating the sum image is not required. Only the target image and the blur-related information are entered, and a blur image can be obtained by directly generating the diagonal image from the target image.

Figure 7:
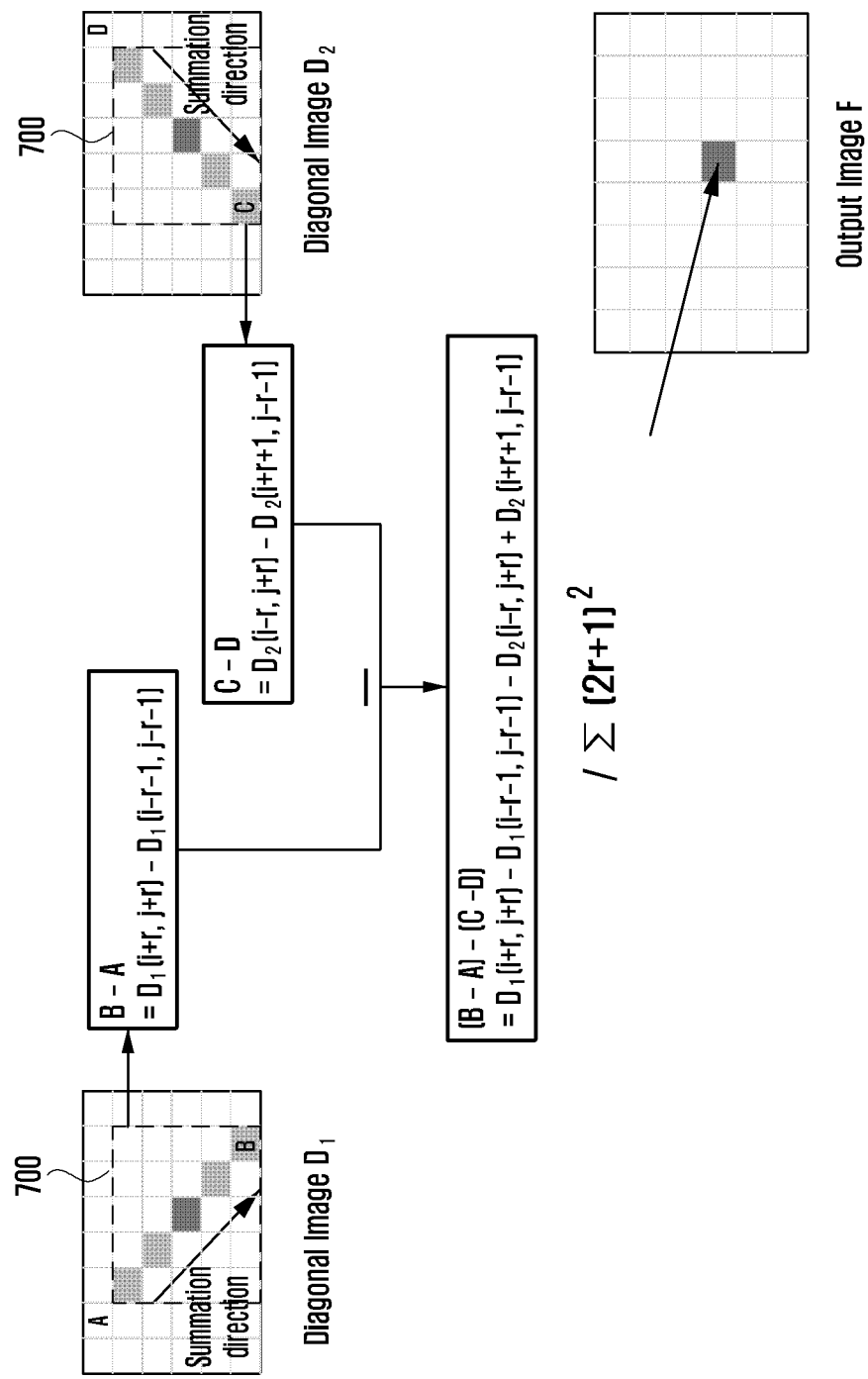
FIG. 7 is a diagram illustrating an operation of generating a blur image according to an embodiment of the present invention.

FIG. 7 is a diagram illustrating an operation of generating a blur image according to an embodiment of the present invention.

A basic principle of generating a blur image is similar as discussed previously in FIG. 1. Namely, blurring for a certain region of interest may be performed through a method for computing the sum of diagonally summed pixel values for the region of interest and then dividing the computed sum by a variable associated with a weighted value.

Specifically, a method for generating a blur image for a region of interest (ROI) 700 uses Equation (4) given below.

$$F(i, j) = \frac{D_1(i+r, j+r) - D_1(i-r-1, j-r-1) - D_2(i-r, i+r) + D_2(i+r+1, j-r-1)}{\sum (2r+1)^2} \quad (4)$$

In Equation (4), $D_1$ and $D_2$ represent respectively two diagonal images generated according to one of four cases of generating a set of two diagonal images in FIG. 6. As discussed above, the diagonal image may be generated from the sum image after the computation of the sum image, or generated directly from the target image according to Equation (3). In Equation (4), the letter 'r' denotes the number of pixels arranged on a straight path from the central pixel of the ROI 700 to the peripheral pixel of the ROI 700. Namely, the value of 'r' may indicate a blur level or be referred to as the size of a blur filter. Specifically, in Equation (4), an output image F (i.e., a blur image) may be obtained as follows. First, the diagonally summed pixel values of pixel A are subtracted from the diagonally summed pixel values of pixel B in the diagonal image $D_1$. Second, the diagonally summed pixel values of pixel D is subtracted from the diagonally summed pixel values of pixel C in the diagonal image $D_2$. Then, the difference between the result of first subtraction and the result of second subtraction is obtained. Finally, the obtained difference is divided by the sum of weighted values. As such, in Equation (4), the blur image is computed in pixels, so that it is possible to allow blurring effects of different levels to coexist by setting different values of 'r' in a single target image.

Figure 8:
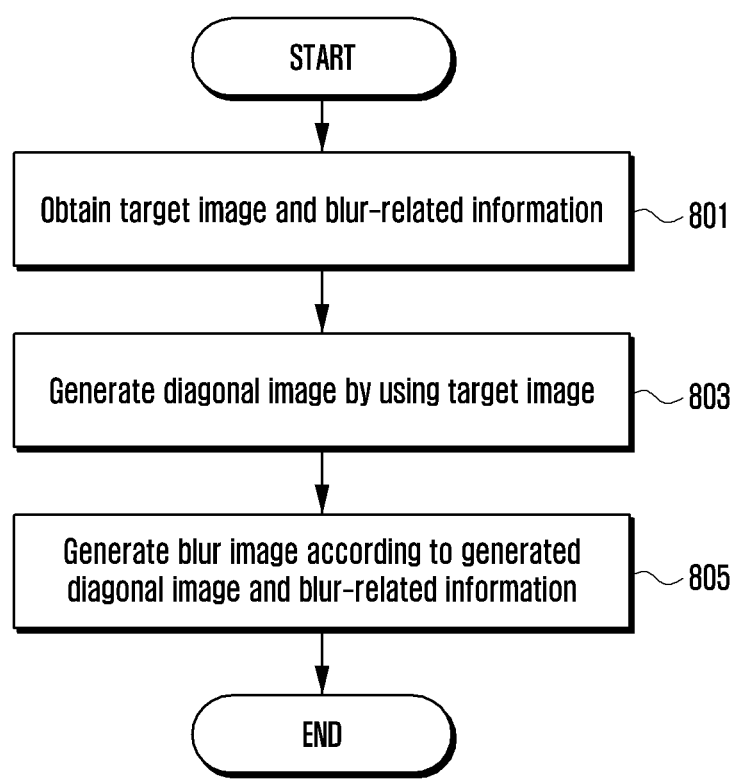
FIG. 8 is a flowchart illustrating a blur image processing method performed by an electronic device according to an embodiment of the present invention.

FIG. 8 is a flowchart illustrating a blur image processing method performed by an electronic device according to an embodiment of the present invention.

Referring to FIG. 8, in step 801, the electronic device (herein, also referred to as a blur image processing apparatus or a blurring apparatus) obtains an original image (herein, also referred to as a target image) and blur-related information for generating a blur image. The target image may be a certain image obtained through a camera module equipped in the blurring apparatus or an input image offered by a user. In addition, the blur-related information may include at least one of a blur level, a size of a blur filter, a type of the blur filter, and information about a region for blurring. The blur level may be predefined as a default value depending on the performance of the blurring apparatus or determined according to a user input. Additionally, as discussed above, blurring may be performed for only a part of the target image, and the blur level may be defined or determined differently according to respective pixels.

The blur-related information may be received through the input unit of the blurring apparatus. The input unit may be a camera module of a smart phone or table PC or an entered image file itself. Additionally, the input unit may be a touch panel or may be implemented in the form of a touch screen together with the output unit. In this case, the touch panel may detect a user's touch input, generate a corresponding touch signal, and recognize the blur-related information according to the touch signal. The touch signal may contain location information (X-axis, Y-axis) and pressure information (Z-axis).

In step 803, the blurring apparatus generates a diagonal image, based on the target image. After a sum image is generated from the target image, the diagonal image may be generated using the sum image. In addition, the diagonal image may also be generated directly from the target image as discussed above in Equation (3).

The sum image may be formed of summed pixel values obtained by accumulatively adding pixel values in the target image. The sum image may be generated using Equation (1) discussed above. Specifically, the sum image may be a set of summed pixel values each of which is obtained by accumulatively adding pixel values from a starting pixel in the original image. The sum image may be generated on the basis of a certain starting pixel which may correspond to one of four corners in the target image. Each summed pixel value, which is a pixel value of the sum image, may be summation of pixel values contained in a rectangular region, diagonally disposed corners of which are defined as the starting pixel and a particular pixel corresponding to the summed pixel value. Using the sum image, the blurring apparatus may generate the diagonal image. Specifically, the diagonal image may be a set of diagonally summed pixel values each of which is obtained by adding the summed pixel values along a diagonal path from the starting pixel to the particular pixel in the sum image. Namely, each of the diagonally summed pixel values may be summation of the summed pixel values computed along one of four diagonal paths connected to the particular pixel. Also, the diagonal image may be formed of a set of two diagonal images generated respectively in different diagonal directions. In addition, the diagonal image may be generated directly from the target image according to Equation (3) without the generation of the sum image.

In step 805, the blurring apparatus generates a blur image from the diagonal image generated in step 803 by using the blur-related information obtained in step 801. Specifically, pixel values of the blur image may be computed according to the blur level as discussed above in FIG. 7 and Equation (4). Namely, after the blur level is determined, the pixel values of the blur image may be obtained by computing the sum of the diagonally summed pixel values in the blur filter according to the blur level and then by dividing the computed sum by the sum of weighted values.

According to the present invention discussed above with reference to FIGS. 4 to 8, weighted values are not applied equally to all pixels in a region of interest, but lower weighted values are applied as pixels are distant from the center. This may prevent the blur image from deteriorating in quality. Additionally, the blurring apparatus may store a blur level map which is predefined or varied according to a user input. Therefore, when different blur levels are determined with regard to respective pixels, the blurring apparatus may generate the blur image with various blur levels applied simultaneously, based on the stored blur level map.

Figure 9A:
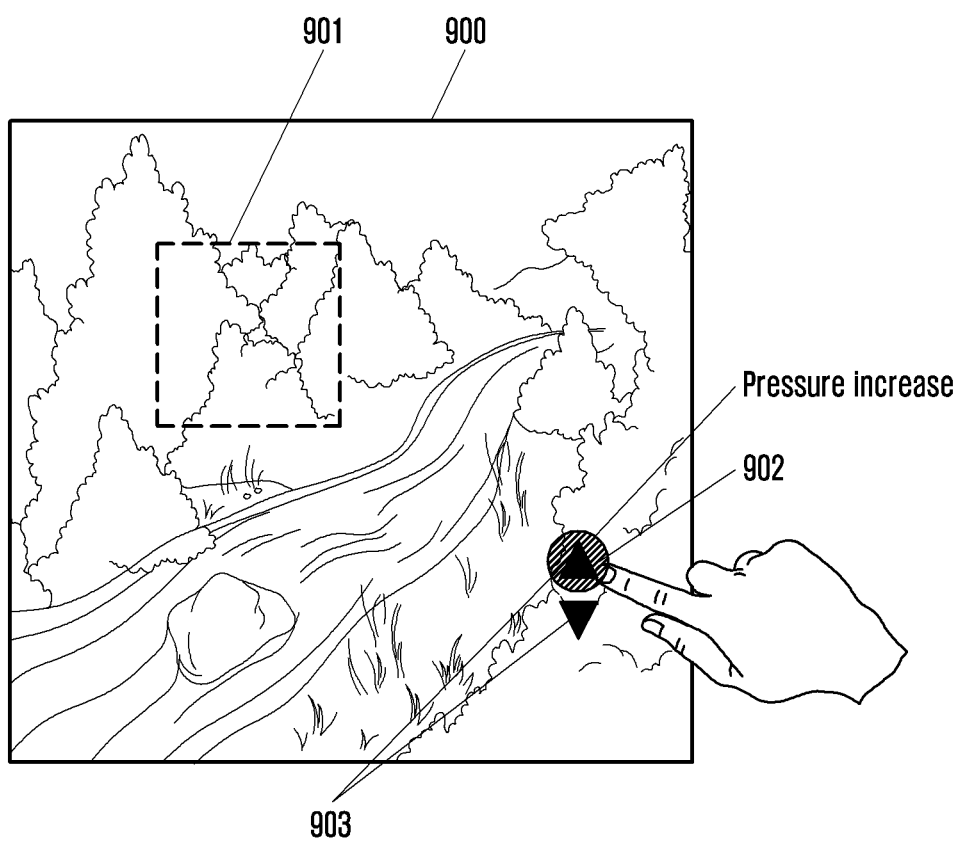
FIG. 9A is a diagram illustrating an operation of entering a blur level or a blur filter size according to a touch pressure on a touch panel.
Figure 9B:
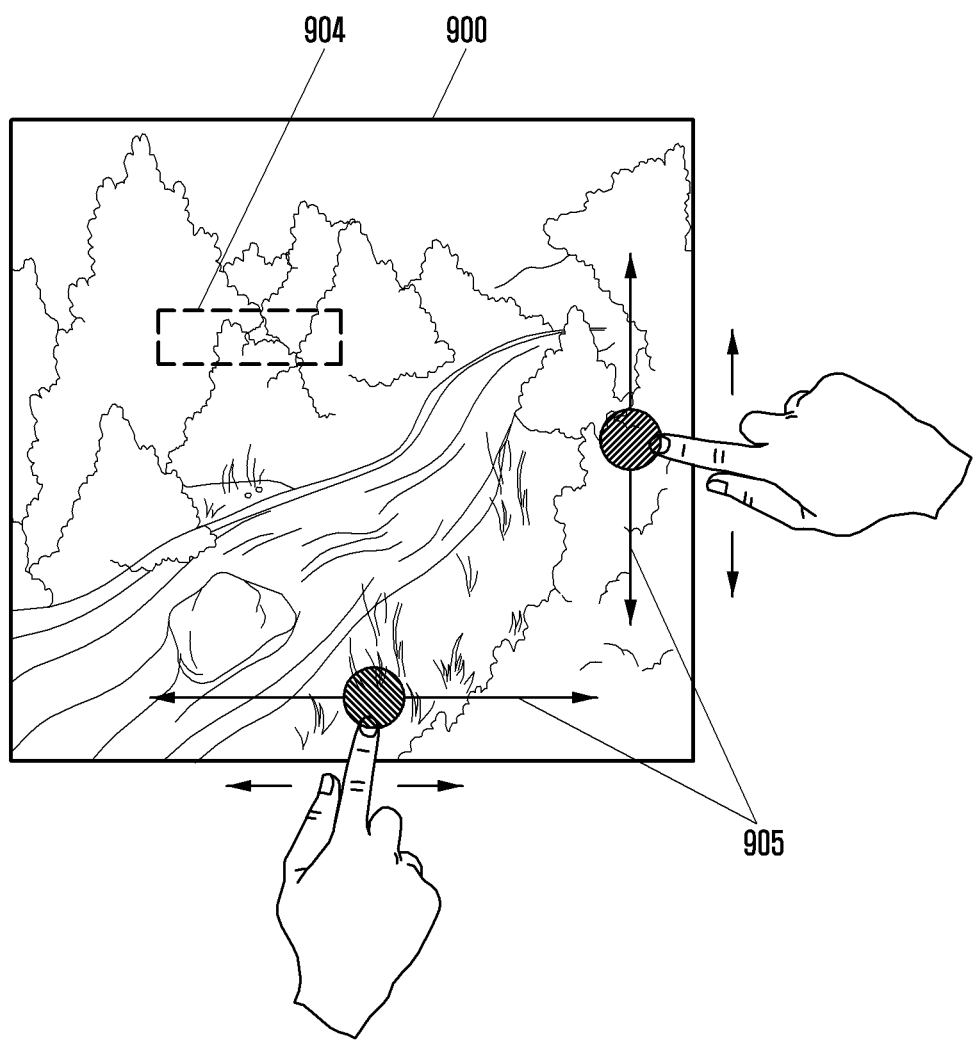
FIG. 9B is a diagram illustrating an operation of entering a blur level or a blur filter size according to a drag input on a touch panel.

FIGS. 9A and 9B show the concept of entering blur-related information through a touch screen according to the present invention.

Specifically, FIG. 9A is a diagram illustrating an operation of entering a blur level or a blur filter size according to a touch pressure on a touch panel.

Referring to FIG. 9A, the input unit of the blurring apparatus according to an embodiment of the present invention may be formed of the touch panel. In this case, a user selects a blur region 901 from among a target image 900 and also touches a certain spot 902 on the touch panel by applying a pressure so as to enter a blur level or blur filter size. From this pressure of user's touch input, the input unit of the blurring apparatus recognizes the blur level or blur filter size. For example, when the pressure of user's touch input is detected as exceeding a threshold value, the blurring apparatus may recognize that a corresponding blur level or blur filter size is entered. The input unit may have an input indicator 903 displayed on the touch screen so as to indicate an input portion for a blur level or blur filter size.

FIG. 9B is a diagram illustrating an operation of entering a blur level or a blur filter size according to a drag input on a touch panel.

Referring to FIG. 9B, the blurring apparatus receives an input of a blur region 904 selected from the target image 900 and also recognizes a drag input for determining a blur level or blur filter size on the touch panel.

The blurring apparatus may recognize an input for the bur level or blur filter size, depending on a drag distance on the touch panel. For example, when a drag input having a certain distance is received, the blurring apparatus may recognize that the blur level or blur filter size corresponding to the drag distance is entered. In this case, a drag input in a specific direction may be considered as an input for increasing the blur level or blur filter size, and another drag input in the opposite direction may be considered as an input for decreasing the blur level or blur filter size. Further, a drag input indicator 905 indicating a drag direction for the blur level or blur filter size may be displayed on the touch screen. When the user enters the blur-related information as shown in FIGS. 9A and 9B, the blurring apparatus offers a blur image in real time.

Hereinbefore, the blurring method and apparatus according to the present invention have been described. Now, in the blurring method, a scheme for determining bits required for computation of generating the blur image will be described.

In the blurring method, the storage size suitable for storing the sum image may be determined according to Table 1.

TABLE 1

| Max Blur Level | Sum of Weighted Values (W) | Max Pixel Sum in Filter (Hexadecimal) | Sum Image Storage Size (S) |
|---|---|---|---|
| 1 | 10 | 9F6 | Min 12 Bit |
| 2 | 35 | 22DD | Min 14 Bit |
| 3 | 84 | 53AC | Min 15 Bit |
| 4 | 165 | A45B | Min 16 Bit |
| 5 | 286 | 11CE2 | Min 17 Bit |
| 6 | 455 | 1C539 | Min 17 Bit |
| 10 | 1771 | 6E415 | Min 19 Bit |
| 37 | 73150 | 11CA042 | Min 25 Bit |
| 232 | 16865707 | 100584F57 | Min 33 Bit |
| 233 | 17083794 | 103A8E46E | Min 33 Bit |

Referring to Table 1, the maximum pixel sum in the filter and the sum of weighted values are estimated, based on the blur level contained in the blur-related information, e.g., entered through the input unit by the user. Further, it is possible to estimate the size of storage for storing the generated sum image or to use the minimum storage size.

For example, if the blur level is 3, the blur image is generated with reference to neighboring pixels having 7×7 sizes. In this case, the sum of weighted values becomes 84 (=7×7+5×5+3×3+1×1). Since a pixel value may have the maximum value 255, the maximum pixel sum in the filter becomes 0x53AC in the hexadecimal numeral system, as would be understood by one skilled in the art. Therefore, the storage size of 15 bits is required minimally for storing the sum image.

In an embodiment of the present invention, the diagonal image is calculated using the sum image. Thus, the minimum bit for computing the diagonal image may be equal to bits of the sum image.

Using the above features, the number of bits for computing the blur image may be estimated. Specifically, when the sum of weighted values and the maximum pixel sum in the filter are determined according to the blur level, the number of bits required for computation of the sum image is determined according to Table 1. Also, since the maximum pixel value is 255, a result of dividing the sum of pixel values in the filter by the sum of weighted values allows the computation of the blur image with minimal errors even though bits excluding high-rank 9 bits are disregarded. This is shown in Table 2.

TABLE 2

| Max Blur Level | Sum of Weighted Values (W) | Required Low-rank Bits (M) of Diagonal Image Data with Size S | Shift Level (N) | Blur Image Storage Size |
|---|---|---|---|---|
| 1 | 10 | Min 12 Bit | Max 3 Bit | 9 Bit |
| 2 | 35 | Min 14 Bit | Max 5 Bit | 9 Bit |
| 3 | 84 | Min 15 Bit | Max 6 Bit | 9 Bit |
| 4 | 165 | Min 16 Bit | Max 7 Bit | 9 Bit |
| 5 | 286 | Min 17 Bit | Max 8 Bit | 9 Bit |
| 6 | 455 | Min 17 Bit | Max 8 Bit | 9 Bit |
| 10 | 1771 | Min 19 Bit | Max 10 Bit | 9 Bit |
| 37 | 73150 | Min 25 Bit | Max 16 Bit | 9 Bit |
| 232 | 16865707 | Min 33 Bit | Max 24 Bit | 9 Bit |
| 233 | 17083794 | Min 33 Bit | Max 24 Bit | 9 Bit |

Figure 10:
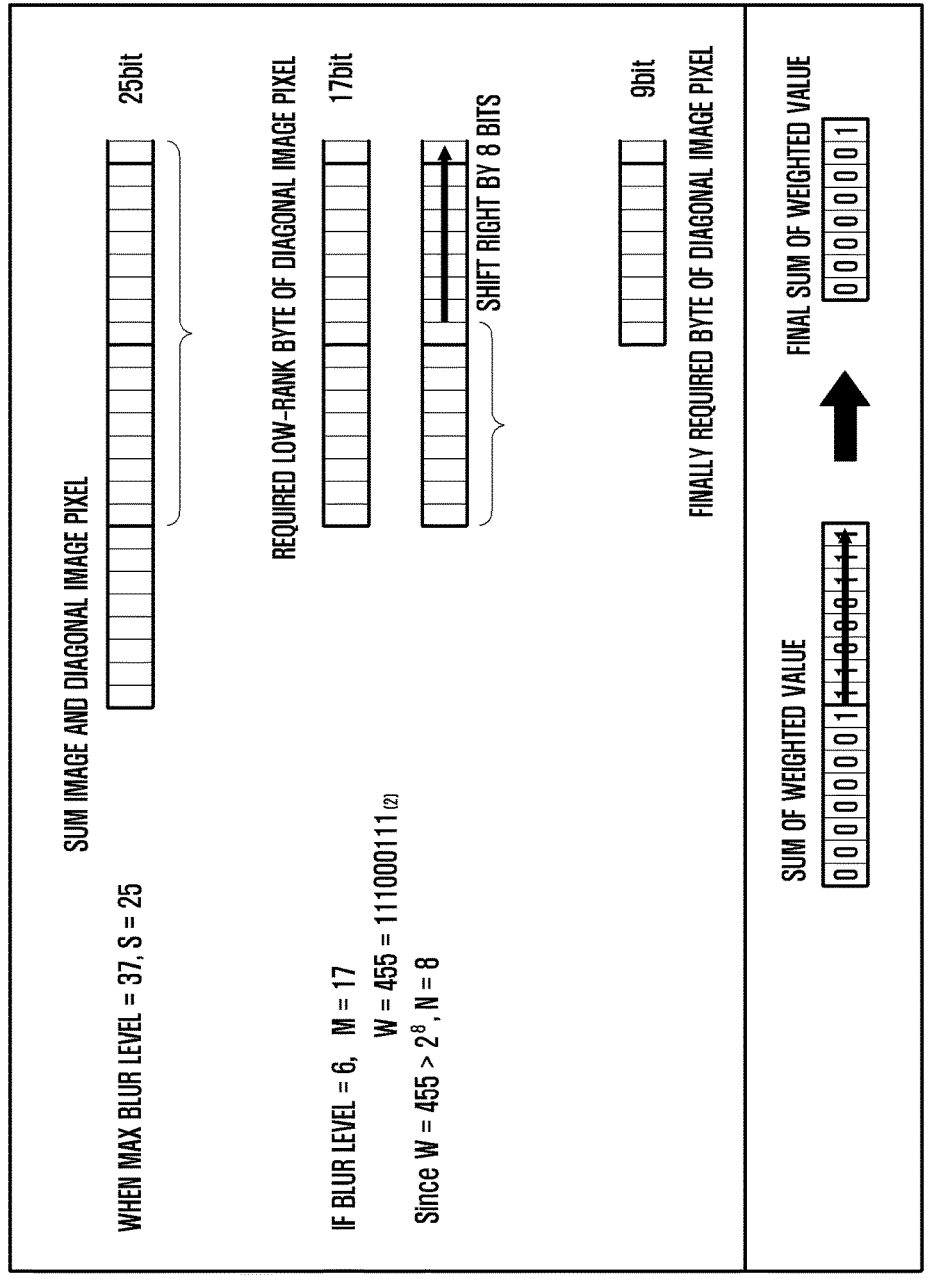
FIG. 10 is a diagram illustrating the minimum bit required for operations performed to generate a blur image.

FIG. 10 is a diagram illustrating the minimum bit required for operations performed to generate a blur image.

Referring to FIG. 10, if the maximum blur level offered by the blurring apparatus is 37, the sum image storage size required minimally is 25 bits as shown in Table 1. In this case, if the blur level determined for the generation of the blur image is 6, the minimum sum image storage size is 17 bits as shown in Table 1. Also, the sum of weighted values is 455, which is expressed as $111000111_{(2)}$ in the binary numeral system, as would be understood by one skilled in the art. A result of computation using Equation (3) for generating the blur image is a pixel value of the blur image after all and thus does not exceed 255. Therefore, the blur image may be obtained with minimized errors even though computation (referred to as shift right) is performed by discarding residual bits excluding high-rank 9 bits. In Table 2, the shift level indicates the maximum bits which can be discarded except high-rank 9 bits, namely, to allow shift processing. The maximum bits capable of being discarded through shift processing should satisfy Equation (5).

$$W > 2^N \qquad (5)$$

In Equation (5), W denotes the sum of weighted values, and N denotes the maximum bits for the shift. In the above example, the computation is performed after discarding low-rank 8 bits through shift processing, and thus bits required for the computation of the blur image becomes 9 bits. In this case, the weighted values as well may be computed through shift processing of low-rank 8 bits.

Figure 11:
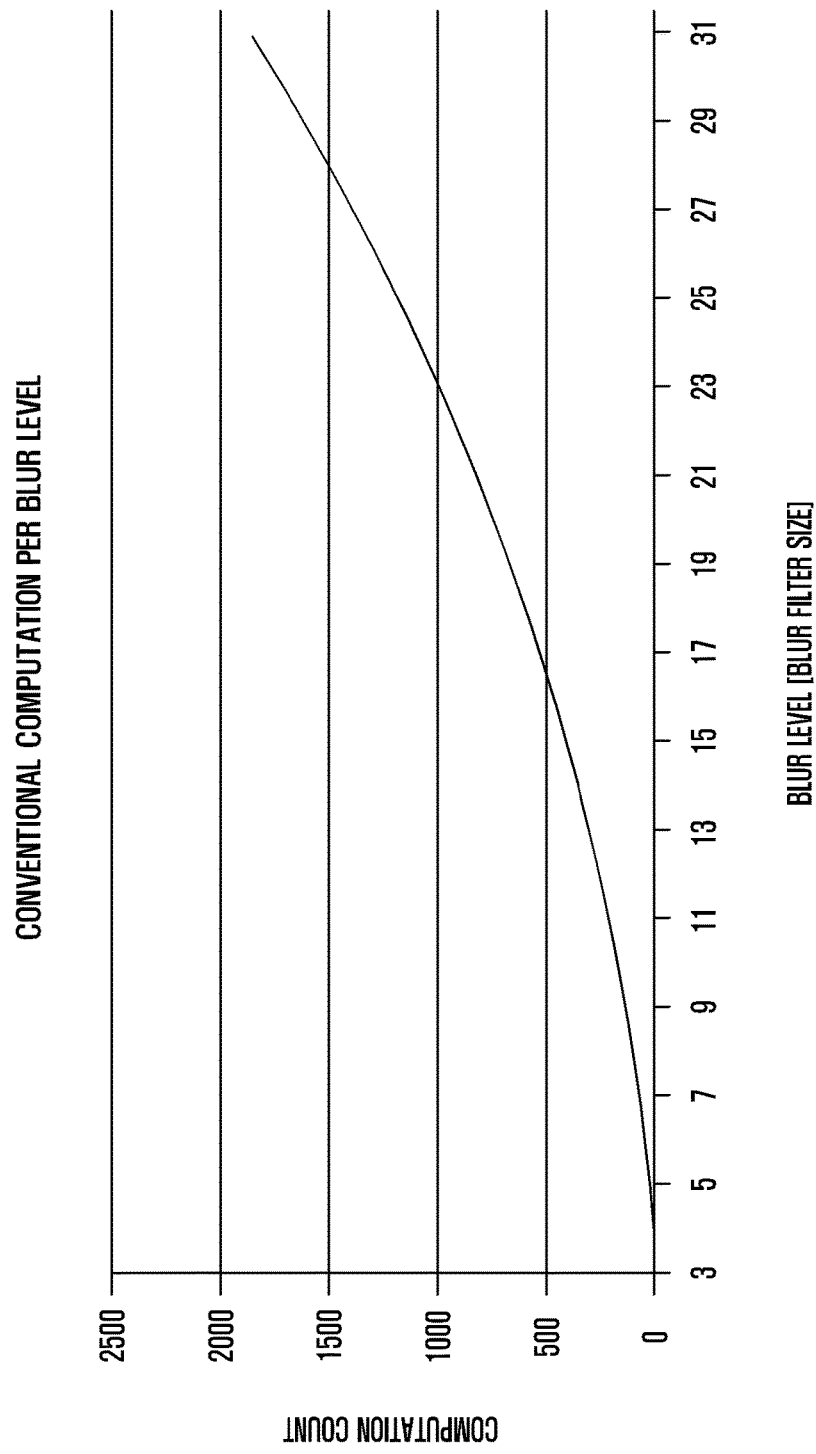
FIG. 11 is a graph illustrating an operation count of blurring using a sum image according to a blur level.

FIG. 11 is a graph illustrating an operation count of blurring using a sum image according to a blur level.

Blurring using the sum image as discussed in FIG. 1 requires the following computations per pixel. If the blur level is N, computation counts required per pixel include N*N multiplications, N*(N−1) additions, and one division. Namely, a total of 2*N*N computations are required per pixel. However, according to blurring using the sum image in the present invention, the blur image may be obtained through a total of four computations per pixel, including three additions (or subtractions) and one division, regardless of the blur level (N).

Figure 12A:
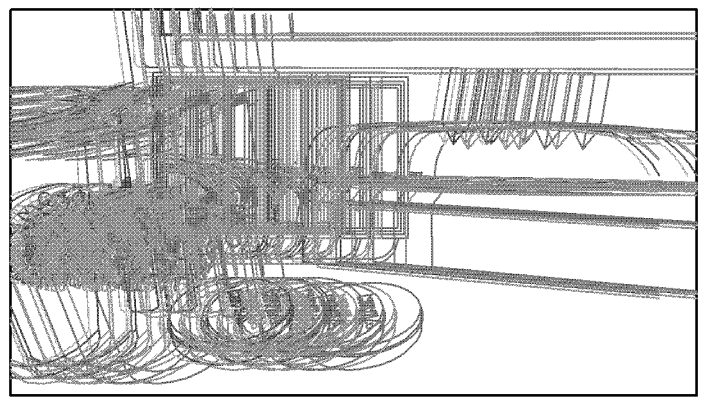
FIGS. 12A and 12B show a blur image using a sum image and a blur image using a diagonal image.
Figure 12B:
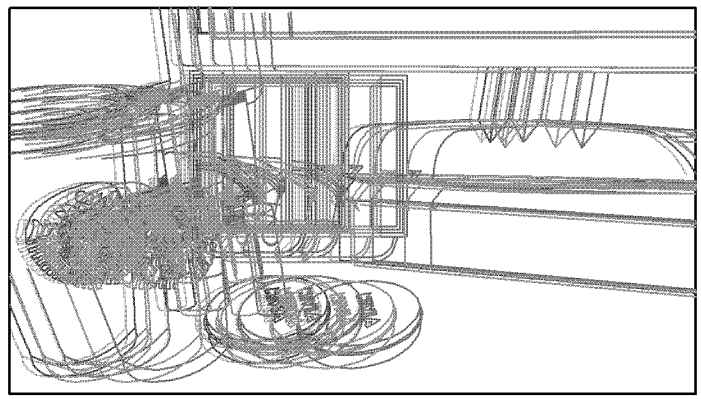

FIGS. 12A and 12B show a blur image using a sum image and a blur image using a diagonal image.

Compared with blurring using the sum image only in FIG. 12A, blurring using the diagonal image in FIG. 12B enhances the quality of blurring and also optimizes, depending on the performance of hardware, the number of bits required for the generation of the blur image. Therefore, the entire memory efficiency may increase.

According to various embodiments of the present invention, weighted values applied to determine pixel values of the blur image are reduced as pixels are distant from a target pixel. This improves a blur quality.

Also, according to various embodiments of the present invention, different blur levels may be applied to respective pixels of the target image. Also, regardless of the blur level, only four computations may be needed to generate the blur image. Also, the number of bits required for generating the blur image may be determined in advance, thus increasing memory efficiency.

While the present invention has been particularly shown and described with reference to certain embodiments thereof, it will be understood by those skilled in the art that various changes in form and details may be made therein without departing from the spirit and scope of the invention as defined by the appended claims.

What is claimed is:

1. A blur image processing method of an electronic device, the method comprising:
    obtaining an original image and blur-related information for generating a blur image;
    generating a diagonal image with regard to each pixel, based on the original image; and
    generating the blur image from the diagonal image by using the blur-related information and weighted values, wherein higher weighted values are applied to central pixels and lower weighted values are applied to neighboring pixels.

2. The method of claim 1, wherein generating the diagonal image includes:
    generating a sum image with regard to the each pixel, based on the original image; and
    generating the diagonal image with regard to the each pixel by using the sum image.

3. The method of claim 2, wherein the sum image is a set of summed pixel values, each of which is obtained by accumulatively adding pixel values from a starting pixel in the original image.

4. The method of claim 3, wherein each of the summed pixel values is a summation of pixel values contained in a rectangular region in which diagonally disposed corners thereof are defined as the starting pixel and a particular pixel corresponding to each summed pixel value.

5. The method of claim 4, wherein the diagonal image is a set of diagonally summed pixel values, each of which is obtained by adding the summed pixel values along a diagonal path from the starting pixel to the particular pixel in the sum image.

6. The method of claim 5, wherein each of the diagonally summed pixel values is a summation of the summed pixel values computed along one of four diagonal paths connected to the particular pixel.

7. The method of claim 1, wherein the blur-related information includes at least one of a blur level, a size of a blur filter, a type of the blur filter, and information about a region for blurring.

8. The method of claim 1, wherein generating the blur image includes:
    computing a summation of diagonally summed pixel values contained in a blur filter corresponding to a blur level contained in the blur-related information; and
    dividing the computed summation of the diagonally summed pixel values by a summation of the weighted values.

9. The method of claim 1, wherein generating the blur image includes:
    determining bits required for generation of the blur image, depending on a blur level contained in the blur-related information.

10. The method of claim 7, wherein the blur level is different according to pixels of the original image.

11. The method of claim 7, wherein the blur-related information is determined in response to a pressure of a touch input or a drag input on a touch screen of the electronic device.

12. A blur image processing apparatus comprising:
    an input configured to obtain an original image and blur-related information for generating a blur image;
    a controller configured to generate a diagonal image with regard to each pixel, based on the original image, and to generate the blur image from the diagonal image by using the blur-related information and weighted values, wherein higher weighted values are applied to central pixels and lower weighted values are applied to neighboring pixels; and
    display configured to display the blur image.

13. The apparatus of claim 12, wherein the controller is further configured to generate a sum image with regard to the each pixel, based on the original image, and to generate the diagonal image with regard to the each pixel by using the sum image.

14. The apparatus of claim 13, wherein the sum image is a set of summed pixel values, each of which is obtained by accumulatively adding pixel values from a starting pixel in the original image.

15. The apparatus of claim 14, wherein each of the summed pixel values is a summation of pixel values contained in a rectangular region in which diagonally disposed corners thereof are defined as the starting pixel and a particular pixel corresponding to each summed pixel value.

16. The apparatus of claim 15, wherein the diagonal image is a set of diagonally summed pixel values, each of which is obtained by adding the summed pixel values along a diagonal path from the starting pixel to the particular pixel in the sum image.

17. The apparatus of claim 16, wherein each of the diagonally summed pixel values is a summation of the summed pixel values computed along one of four diagonal paths connected to the particular pixel.

18. The apparatus of claim 12, wherein the blur-related information includes at least one of a blur level, a size of a blur filter, a type of the blur filter, and information about a region for blurring.

19. The apparatus of claim 12, wherein the controller is further configured to compute a summation of diagonally summed pixel values contained in a blur filter corresponding to a blur level contained in the blur-related information, and to divide the computed summation of the diagonally summed pixel values by a summation of the weighted values.

20. The apparatus of claim 12, wherein the controller is further configured to determine bits required for generation of the blur image, depending on a blur level contained in the blur-related information.

21. The apparatus of claim 18, wherein the blur level is different according to pixels of the original image.

22. The apparatus of claim 18, wherein the blur-related information is determined in response to a pressure of a touch input or a drag input on the input.

* * * * *